(12) United States Patent
Prosdocimi

(10) Patent No.: US 7,755,245 B2
(45) Date of Patent: Jul. 13, 2010

(54) SYNCHRONOUS MOTOR WITH PERMANENT-MAGNET ROTOR

(75) Inventor: Andrea Prosdocimi, Padua (IT)

(73) Assignee: Promovet S.R.L., Noventa Padovana (IT)

( * ) Notice: Subject to any disclaimer, the term of this patent is extended or adjusted under 35 U.S.C. 154(b) by 622 days.

(21) Appl. No.: 11/637,796

(22) Filed: Dec. 13, 2006

(65) Prior Publication Data

US 2007/0138898 A1     Jun. 21, 2007

(30) Foreign Application Priority Data

Dec. 16, 2005    (IT)   .................. PD20050099 U

(51) Int. Cl.
*H02K 1/06* (2006.01)

(52) U.S. Cl. ............... 310/216.023; 310/49.01; 310/216.036; 310/254.1

(58) Field of Classification Search ................. 310/216, 310/217, 49 R, 254, 216.023–216.039
See application file for complete search history.

(56) References Cited

U.S. PATENT DOCUMENTS

| | | | | |
|---|---|---|---|---|
| 495,562 | A * | 4/1893 | Perret .................. | 310/216.035 |
| 3,502,922 | A * | 3/1970 | Welker ................. | 310/172 |
| 3,694,903 | A * | 10/1972 | Deming ............... | 29/596 |
| 3,778,897 | A * | 12/1973 | Bock et al. ............ | 29/609 |
| 3,826,941 | A * | 7/1974 | Folmar ................. | 310/217 |
| 4,554,471 | A * | 11/1985 | Bertram et al. ........ | 310/49 R |
| 4,782,353 | A * | 11/1988 | Ogihara et al. ........ | 396/463 |
| 4,806,813 | A * | 2/1989 | Sumi et al. ........... | 310/254 |
| 5,068,562 | A * | 11/1991 | Tagami et al. ......... | 310/256 |
| 5,302,875 | A * | 4/1994 | Taghezout ............. | 310/49 R |
| 5,418,588 | A * | 5/1995 | Chigira ................ | 396/463 |
| 5,600,194 | A * | 2/1997 | Toukola ............... | 310/105 |
| 5,729,071 | A * | 3/1998 | Steiner ................ | 310/254 |
| 5,757,108 | A * | 5/1998 | Suzuki ................. | 310/49 R |
| 5,945,750 | A * | 8/1999 | Sauter et al. ......... | 310/49 R |
| 5,969,444 | A * | 10/1999 | Kamitani ............. | 310/49 R |
| 6,169,350 | B1 | 1/2001 | Yang | |
| 2002/0113502 | A1* | 8/2002 | Watanabe ............. | 310/49 R |
| 2004/0046463 | A1* | 3/2004 | Takemoto et al. ...... | 310/49 R |

FOREIGN PATENT DOCUMENTS

| | | |
|---|---|---|
| JP | 61 010958 A | 1/1986 |
| JP | 01 138956 A | 5/1989 |
| JP | 03 139150 A | 6/1991 |
| JP | 05227725 A * | 9/1993 |
| JP | 06 113515 A | 4/1994 |
| JP | 2000 324775 A | 11/2000 |

\* cited by examiner

*Primary Examiner*—Quyen Leung
*Assistant Examiner*—Alex W Mok
(74) *Attorney, Agent, or Firm*—Modiano & Associati; Albert Josif; Daniel J. O'Byrne

(57) ABSTRACT

A synchronous motor with permanent-magnet rotor, of the type comprising a stator with corresponding windings and a rotor arranged between pole shoes formed by the stator. The stator is constituted by two C-shaped ferromagnetic bodies whose ends form two pairs of pole shoes. Respective spools with windings are arranged along the ferromagnetic bodies. The two pairs of pole shoes are angularly mutually offset so that two pole shoes, each belonging to a distinct ferromagnetic body, are internal with respect to the angular configuration thus formed and the other two pole shoes are external with respect to the same angular configuration. The external pole shoes have a same axial height and wrap around a same axial portion of the rotor.

4 Claims, 3 Drawing Sheets

SYNCHRONOUS MOTOR WITH PERMANENT-MAGNET ROTOR

BACKGROUND OF THE INVENTION

Single-phase permanent-magnet synchronous electric motors are constituted by a stator, in which the electromagnet is formed by a lamination pack on which the corresponding windings are wound, and a rotor, which is arranged between the pole shoes formed by the stator.

As is known, these electric motors are of the bidirectional type: in practice, at power-on the rotor can be induced equally to rotate clockwise or counterclockwise; this occurs mainly because the magnetic field generated between the pole shoes of the stator when the induction windings are powered with alternating current is a pulsed field.

In view of these considerations, these synchronous permanent-magnet motors are currently widely used in applications in which the direction of rotation is not important, such as for example in association with impellers with radial vanes of centrifugal pumps, which ensure the same performance in both directions of rotation.

If one wishes to increase the efficiency of pumps driven by a synchronous motor, it is necessary to use impellers with vanes which are appropriately contoured.

To do this, however, it is necessary to control the direction of rotation when the motor is driven; for this reason, electronic starters which allow to control the direction of rotation of rotors of synchronous motors and devices for locking the rotor if it starts in the wrong direction have been studied, allowing in practice to control the direction of rotation in any operating condition of the motor.

One particular solution to allow to start the motor according to a direction of rotation chosen at will is disclosed in Italian Patent No. 1324617 filed by this same Applicant.

This solution describes a synchronous permanent-magnet motor which comprises a stator, with an electromagnet formed by a lamination pack and corresponding windings, and a rotor which is arranged between pole shoes formed by the stator.

The motor is characterized in that it comprises two pairs of pole shoes, each formed by a separate C-shaped lamination pack, which are mutually angularly offset.

The lamination packs support respective adjacent spools with windings.

The windings are for example connected to an AC power supply by using a capacitor and a switch; the position of the switch determines the direction of rotation of the rotor, arranging each winding alternately in series to the capacitor and in parallel to the other winding.

As an alternative, the windings are connected in series to respective triacs, which are arranged between said windings and control electronics for sending sequences of half-waves, or there can be an electronic control with phase slicing of one of the two windings in order to generate a field with a rotating component which, by reversing the actuation of the windings, achieves control over the direction of rotation of the rotor.

The particular C-shaped structure allows to have a motor which is compact and has limited space occupation.

The particular structure of the C-shaped lamination packs is such that the pole shoes of one lamination pack intersect, at a different axial height, the pole shoes of the other lamination pack; the two pairs of pole shoes wrap around the rotor at different axial heights.

This causes the rotor to tend to oscillate axially, if left free, or in any case to vibrate axially, since the electromagnetic flux generated by the pole shoes is alternately at different axial heights (and the rotor tends to be arranged symmetrically with respect to the magnetic flux).

SUMMARY OF THE INVENTION

The aim of the present invention is to provide a synchronous permanent-magnet motor which allows to control at will the direction of rotation without having to resort to the electronic and/or mechanical devices known in the background art and has a simple and cheap structure.

Within this aim, an object of the invention is to provide a synchronous permanent-magnet motor which solves the problems of axial vibrations in the solution described above.

Another object is to provide a synchronous permanent-magnet motor which has a limited space occupation.

Another object of the present invention is to provide a synchronous permanent-magnet motor which can be manufactured with known systems and technologies.

This aim and these and other objects, which will become better apparent hereinafter, are achieved by a synchronous motor with permanent-magnet rotor, of the type which comprises a stator with corresponding windings and a rotor arranged between pole shoes formed by the stator, said stator being constituted by two substantially C-shaped ferromagnetic bodies whose ends form two pairs of said pole shoes, respective spools with said windings being arranged along said ferromagnetic bodies, said two pairs of pole shoes being angularly mutually offset so that two pole shoes, each belonging to a distinct ferromagnetic body, are internal with respect to the angular configuration thus formed and the other two pole shoes are external with respect to the same angular configuration, characterized in that the pole shoes which are external with respect to the angular configuration thus formed have substantially the same axial height and wrap around the same axial portion of said rotor.

BRIEF DESCRIPTION OF THE DRAWINGS

Further characteristics and advantages of the invention will become better apparent from the following detailed description of three preferred but not exclusive embodiments thereof, illustrated by way of non-limiting example in the accompanying drawings, wherein.

DESCRIPTION OF THE PREFERRED EMBODIMENTS

Figure 1:
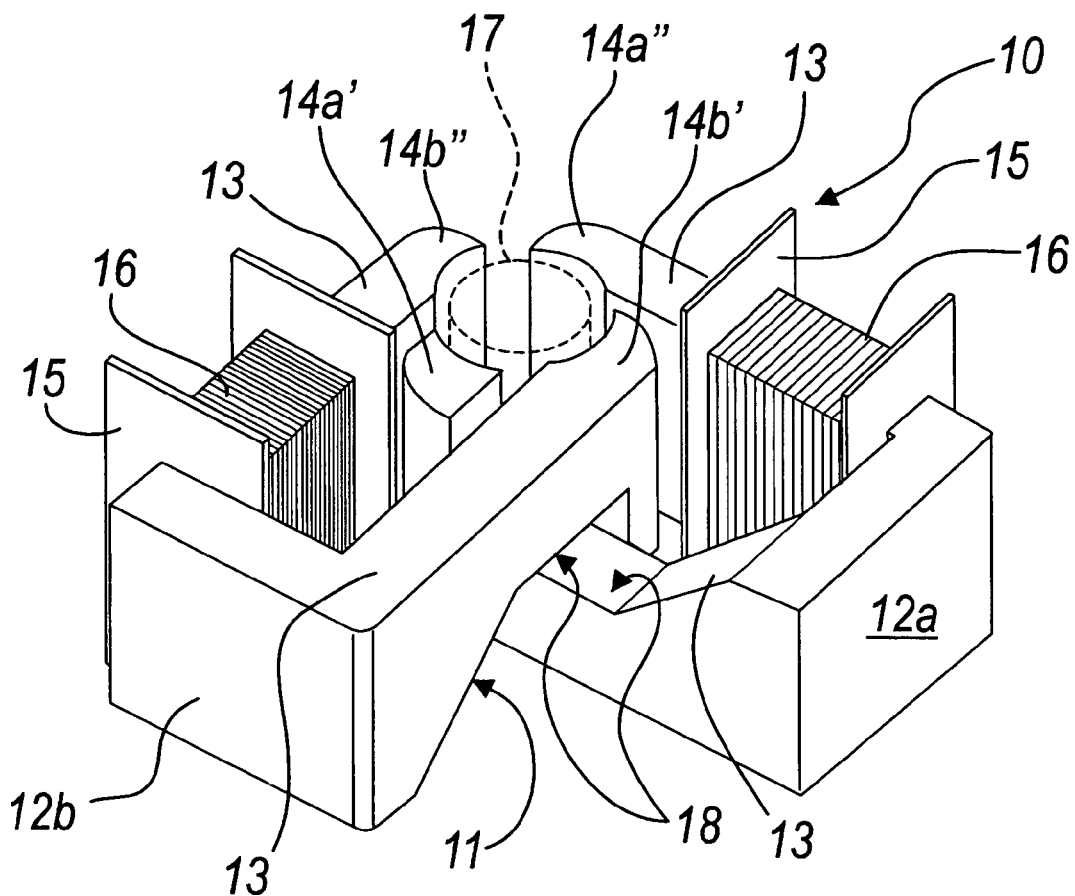
FIG. 1 is a perspective view of a motor according to the invention.
Figure 2:
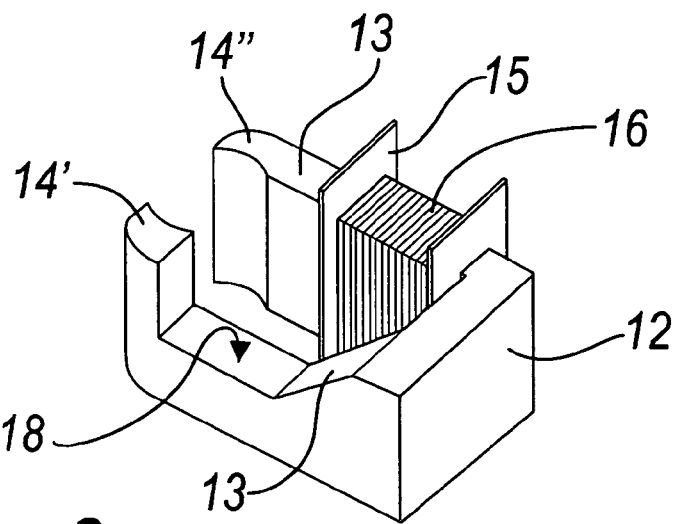
FIG. 2 is a perspective view of a component of the stator of the motor of FIG. 1.

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

With reference to the figures, a first embodiment of a synchronous motor according to the invention is generally designated by the reference numeral 10.

The synchronous motor 10 comprises a stator 11, which is constituted by two distinct ferromagnetic bodies 12a and 12b, which are substantially C-shaped and are mutually associated as explained hereinafter.

The ends of each ferromagnetic body 12b, in particular of the mutually opposite arms 13 which constitute the C-shape, form two pairs of pole shoes, designated respectively by the reference numerals 14a and 14b.

In particular, the mutually opposite arms 13 of each ferromagnetic body 12 are substantially mutually parallel.

A spool 15 for supporting windings 16 is arranged on the arm 13 of each ferromagnetic body (several spools, for example one spool for each arm, can be present in other embodiments).

A rotor 17, shown in broken lines in FIG. 1, is arranged between the pole shoes 14a and 14b.

The two ferromagnetic bodies are fixed in a known manner to a supporting structure, which is not shown in the figures, and are mutually associated so that the pole shoes 14a and 14b are angularly mutually offset, for example by 90 sexagesimal degrees.

This produces an angular configuration of the stator in which two pole shoes 14, each belonging to a distinct ferromagnetic body 11, are internal with respect to the angular configuration and the other two pole shoes are external with respect to said angular configuration.

In particular, the internal pole shoes are designated by first primes (14a' and 14b') and the external pole shoes are designated by second primes (12a" and 12b").

The spools 15 are arranged on the arms 13 that correspond to the external pole shoes 14a" and 14b" (as mentioned, spools might be present on each arm in different embodiments).

As clearly shown in FIG. 1, the ferromagnetic bodies 12 are mutually substantially identical and both have a recess 18 in an intermediate point of one of the two mutually opposite arms 13; in particular, the recesses 18 are formed on the arms 13 that correspond to the internal pole shoes 14a' and 14b' and are oriented parallely to the axis of the rotor.

The recesses 18 allow the overlap of the ends of the ferromagnetic bodies 12 which correspond to the internal pole shoes 14a' and 14b', so that the poles of the pair of pole shoes 14a are crossed with respect to the poles of the pair of pole shoes 14b.

In particular, the external pole shoes 14a" and 14b" have the same axial height and wrap around the same axial portion of the rotor 17.

In this embodiment, the internal pole shoes 14a' and 14b' substantially (i.e. within the height tollerances that are allowable in the pertinent technical field) have the same axial height and wrap around the same axial portion of the rotor 17 as the external pole shoes 14a" and 14b".

Advantageously, in view of the particular shape of the ferromagnetic bodies 12, said bodies are formed monolithically by sintering a material constituted substantially by small granules of ferromagnetic material which are electrically insulated (related to materials commonly known by the English acronym SMC: Soft Magnetic Composites), such as for example the material known by the trade name SOMA-LOY 500.

Figure 3:
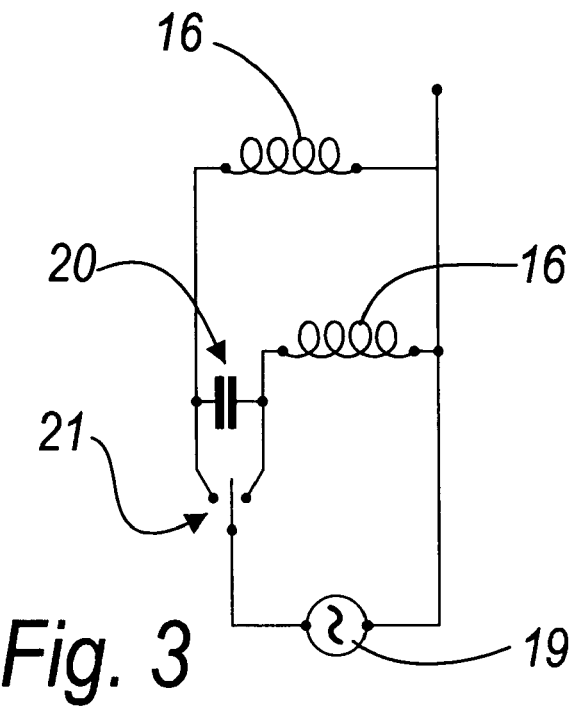
FIG. 3 is a diagram of a connection to a power supply of the electric motor according to the invention.

FIG. 3 illustrates an example of a diagram for connection to an AC power supply 19 and of a control with a capacitor 20 which can be used for the motor.

The capacitor 20 provides the appropriate phase shift between the currents.

The position of the switch 21 determines the direction of rotation of the rotor, arranging each winding 16 alternately in series to the capacitor 20 and in parallel to the other winding 16.

Of course, other connection layouts are possible, as shown for example in said Italian Patent No. 1324617.

Figure 4:
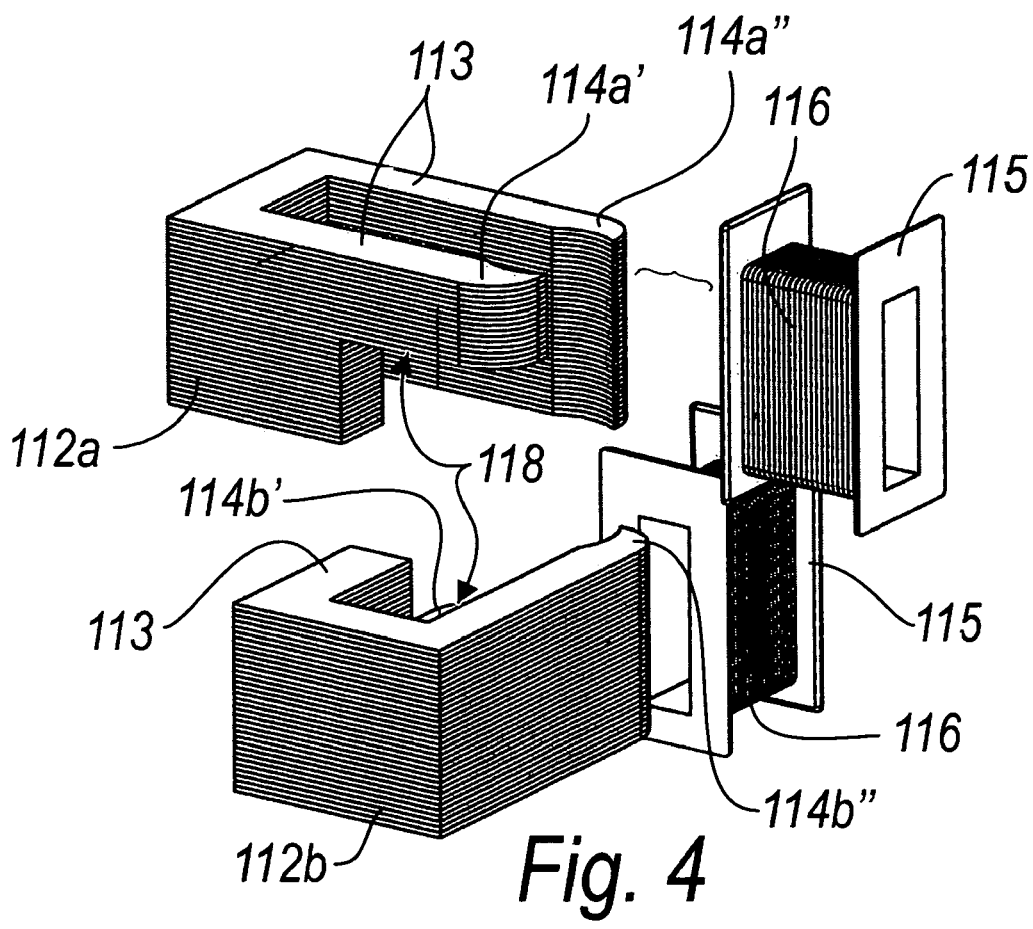
FIG. 4 is an exploded perspective view of the stator with windings of a second embodiment of the electric motor according to the invention which is alternative with respect to the one shown in the preceding figures.

A second embodiment of an electric motor according to the invention is shown in the exploded perspective view of FIG. 4 (the rotor is omitted in said figure for the sake of simplicity).

In this embodiment, the two ferromagnetic bodies, now designated by the reference numerals 112a and 112b, are also identical and are formed by lamination packs according to the background art.

The internal pole shoes 114a' and 114b' have an axial height which is slightly less than half the height of the external pole shoes 114a" and 114b", and wrap around part of the axial portion of the rotor around which the external pole shoes 114a" and 114b" are wrapped.

In this case also, the smaller axial height of the internal pole shoes 114a' and 114b' is determined by recesses 118 (parallel to the axis of the rotor) which are formed at the ends of the arms 113 that correspond to the internal pole shoes 114a' and 114b'.

The recesses 118 are suitable to allow the overlap of the ends of the ferromagnetic bodies 112 which correspond to the internal pole shoes 114a' and 114b', so that the poles of the pair of pole shoes 114a are crossed with respect to the poles of the pair of pole shoes 114b.

The spools 115 for supporting windings 116 are mounted on the arms 113 related to the external pole shoes 114a" and 114b" (in this case also, different embodiments can have spools on each arm).

Figure 5:
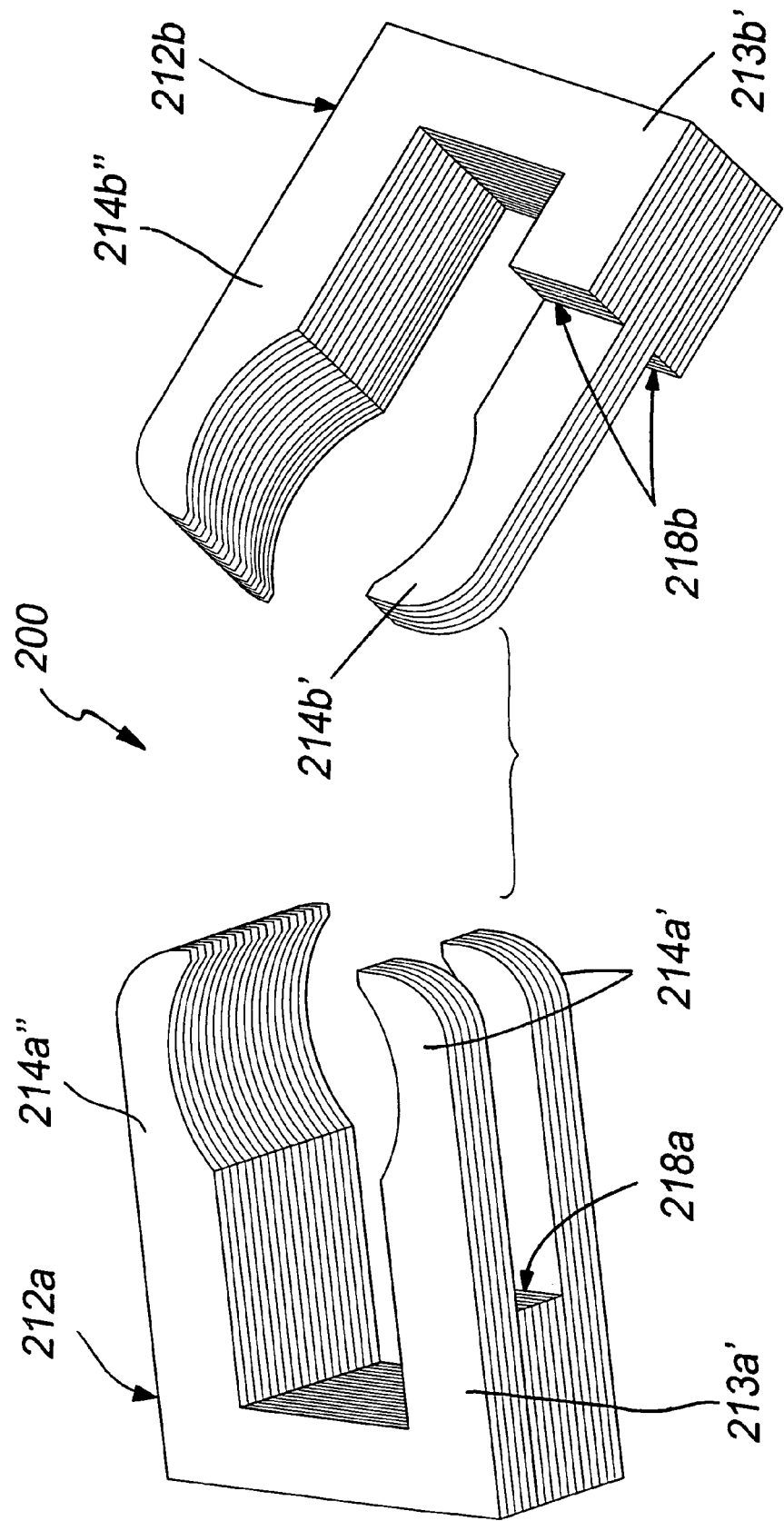
FIG. 5 is an exploded perspective view of the stator with windings of a third embodiment of the electric motor according to the invention which is alternative with respect to the one shown in the preceding figures.

A third embodiment of an electric motor according to the invention is shown in the exploded perspective view of FIG. 5 and is designated by the reference numeral 200 (the rotor and the spools have been omitted in this figure for the sake of simplicity).

In this embodiment, the two ferromagnetic bodies, now designated by the reference numerals 212a and 212b, are formed by lamination packs according to the background art.

As in the preceding embodiments, the external pole shoes 214a" and 214b" have the same axial height and substantially wrap around the same axial portion of the rotor.

As in the preceding examples, the two ferromagnetic bodies are fixed in a known manner to a supporting structure (not shown in the figures) and are mutually associated so that the pole shoes 214a and 214b are angularly mutually offset for example by 90 sexagesimal degrees; in the exploded view of FIG. 5, this angular offset is not highlighted.

In this embodiment, the two ferromagnetic bodies are not identical but differ at the internal pole shoes 214a' and 214b'; accordingly, the ferromagnetic bodies are referenced respectively as first ferromagnetic body 212a and second ferromagnetic body 212b; likewise, the internal pole shoes are referenced as first internal pole shoe 214a' and second internal pole shoe 214b'.

In this embodiment, the recesses, formed on the arms 213a' and 213b' of the ferromagnetic bodies 212a and 212b, are in fact mutually different and therefore are referenced as first recesses 218a and 218b.

A first recess 218a is provided on the first arm 213a' of the first ferromagnetic body 212a and protrudes longitudinally from the end of said arm, at right angles to the axis of the rotor, to an intermediate position, and divides the first arm 213a' into two portions (which in this embodiment are identical), which form two parallel parts of the first internal pole shoe 214a' which wrap axially around the rotor (in practice, the first recess 218a forms a discontinuity on the first internal pole shoe 214a').

Two second recesses 218b (which in this embodiment are identical) are provided on the second arm 213b' of the second ferromagnetic body 212a and protrude longitudinally from the end of said arm, at right angles to the axis of the rotor, to an intermediate position, respectively on mutually opposite portions with respect to an intermediate plane of the arm 213b', in practice so as to reduce the thickness of the arm 213b' in the axial direction.

The thickness in the axial direction of the second internal pole shoe 214b' is slightly lower than the height in the axial direction of the recess formed on the first internal pole shoe 214a'.

The second internal pole shoe 214b' is inserted in the first recess 218a.

The recesses 218 are suitable to allow the overlap of the ends of the ferromagnetic bodies 212 that correspond to the internal pole shoes 214a' and 214b', so that the poles of the pair of pole shoes 214a are crossed with respect to the poles of the pair of pole shoes 214b.

In practice it has been found that the invention thus described achieves the intended aim and objects.

In particular, the present invention provides a synchronous motor with permanent-magnet rotor which, by way of a simple and cheap structure, allows to control at will the direction of rotation without having to resort to the electronic and/or mechanical devices known in the background art and at the same time reduces the problems of axial vibrations of the rotor that occur in similar known devices.

This has been achieved by making at least the external pole shoes wrap around the same axial portion of the rotor.

In practice, the materials employed, so long as they are compatible with the specific use, as well as the dimensions, may be any according to requirements and to the state of the art.

The disclosures in Italian Utility Model Application No. PD2005U000099 from which this application claims priority are incorporated herein by reference.

What is claimed is:

1. A synchronous motor with permanent-magnet rotor, comprising:
    a stator with corresponding windings and pole shoes;
    a rotor arranged between the pole shoes formed by the stator, said stator being constituted by two C-shaped ferromagnetic bodies with ends of said two bodies forming two pairs of said pole shoes;
    respective spools provided on said pole shoes and supporting said windings arranged along said ferromagnetic bodies, said two pairs of pole shoes being angularly mutually offset so that two of said pole shoes, each arranged on a distinct ferromagnetic body, are internal with respect to an angular configuration thus formed and another two of said pole shoes are external with respect to the same angular configuration, and
    wherein said two pole shoes which are external with respect to the angular configuration formed have, substantially, a same axial height and wrap around a same axial portion of said rotor,
    wherein said ferromagnetic bodies have, on the arms that correspond to said internal pole shoes, at least one recess which allows overlap of ends of said ferromagnetic bodies which correspond to said internal pole shoes so that poles of one pair of said pole shoes are crossed with respect to poles of a second pair of said pole shoes, and
    said motor having two said recesses, a first recess of said recesses being provided on said first arm of a first one of said ferromagnetic bodies and protruding longitudinally from an end of said first arm, at right angles to an axis of the rotor, to an intermediate position, and dividing said first arm into two portions, which form two parallel parts of a first one of said internal pole shoes which wrap axially around said rotor, said two second recesses being provided on a second one of said arms of a second one of said ferromagnetic bodies which protrude longitudinally from an end of said second arm at right angles to the axis of said rotor, to an intermediate position, respectively on mutually opposite portions with respect to an intermediate plane of said second arm a thickness in an axial direction of a second one of said internal pole shoes being slightly lower than a height in an axial direction of said first recess formed on said first internal pole shoe, said second internal pole shoe being inserted in said first recess.

2. The synchronous motor of claim 1, wherein said two pairs of pole shoes are provided angularly mutually offset by 90 sexagesimal degrees.

3. The synchronous motor of claim 1, wherein said ferromagnetic bodies have each mutually opposite arms that are mutually parallel, said spools being arranged on said mutually opposite arms which correspond to said external pole shoes.

4. The synchronous motor of claim 1, wherein said ferromagnetic bodies are formed by lamination packs.

\* \* \* \* \*